(12) United States Patent  (10) Patent No.: US 7,753,071 B2
Wood  (45) Date of Patent: Jul. 13, 2010

(54) LEAK DETECTOR PAD

(75) Inventor: Jonathan R. Wood, Sudbury, MA (US)

(73) Assignee: Altos Limited LC, Sudbury, MA (US)

( * ) Notice: Subject to any disclaimer, the term of this patent is extended or adjusted under 35 U.S.C. 154(b) by 290 days.

(21) Appl. No.: 12/008,525

(22) Filed: Jan. 11, 2008

(65) Prior Publication Data

US 2008/0179962 A1  Jul. 31, 2008

Related U.S. Application Data

(60) Provisional application No. 60/884,566, filed on Jan. 11, 2007.

(51) Int. Cl.
*G08B 21/08* (2006.01)
(52) U.S. Cl. .................. 137/558; 137/312; 340/604; 340/605
(58) Field of Classification Search ............ 137/312, 137/558; 340/604, 605; 73/40.5 R; 307/98
See application file for complete search history.

(56) References Cited

U.S. PATENT DOCUMENTS

| | | | |
|---|---|---|---|
| 3,069,671 A | | 12/1962 | Taylor |
| 6,445,565 B1 | | 9/2002 | Toyoda et al. |
| 6,950,032 B1 | * | 9/2005 | Hewitt et al. ............... 137/312 |
| 7,292,155 B2 | * | 11/2007 | Vokey et al. ............... 340/605 |
| 7,549,435 B2 | * | 6/2009 | Walter ....................... 137/312 |
| 7,605,710 B2 | * | 10/2009 | Crnkovich et al. ......... 340/604 |

OTHER PUBLICATIONS

GIVE Systems, Inc.; "Aqua-Stop, Water leak detection—information on sensors"; http://aqua-stop.com/detector.html; Oct. 11, 2005.
Baxter; "Capacitive Sensors"; Copyright Jun. 26, 2000, pp. 1-17.

* cited by examiner

*Primary Examiner*—Kevin L Lee
(74) *Attorney, Agent, or Firm*—Edwards Angell Palmer & Dodge LLP; George N. Chaclas

(57) ABSTRACT

A leak detector pad comprising a circuit board having a bottom surface and a top surface, spaced first and second electrically conductive traces located on the bottom surface, and an electronic circuit mounted on the top surface. The circuit includes a first segment adapted to create an alternating current (AC) voltage waveform, a second segment adapted to apply the AC voltage waveform between the traces on the bottom surface of the circuit board, a third segment adapted to create a measure of a capacitance between the traces based upon an AC current flowing between the traces as a result of the AC voltage waveform, and a fourth segment adapted to create a direct current (DC) voltage alarm signal if the measure of capacitance provided by the third segment indicates the presence of fluid.

20 Claims, 15 Drawing Sheets

Gas Fired Water Heater

Electric Water Heater

LEAK DETECTOR PAD

CROSS-REFERENCE TO RELATED APPLICATION

This application claims priority to U.S. Provisional Patent Application No. 60/884,566 filed Jan. 11, 2007, which is incorporated herein by reference.

TECHNICAL FIELD OF THE DISCLOSURE

The present disclosure generally relates to a water sensor and, more particularly, to a leak detector pad including a water sensor. Even more particularly, the present disclosure relates to a water detector shut-off system that includes a leak detector pad for detecting water leakage from household appliances, such as hot water heaters, and shut-off mechanisms, such as water valves, for shutting off water supply to a leaking appliance.

BACKGROUND OF THE DISCLOSURE

Household flooding costs homeowners and insurance companies millions of dollars in damages every year in the United States alone. Bursting pipes or leaking or malfunctioning appliances, for instance, can cause such household flooding. The resultant flooding often causes damage to the surrounding environment as well as to the appliance itself. For example, flooding of laundry rooms is such a common occurrence that many housing codes now require washing machines to be positioned within catch basins. Thus, when the inevitable overflow occurs, it is hoped that the water will be contained within the catch basins and that the water will not flow into other regions of the laundry rooms.

However, unless the manually operated shut-off valves, which are typically positioned at the wall behind most washing machines, are closed, water can surge unrestricted through a burst supply hose or can spill from the tank of the malfunctioning washing machine. It is estimated that the unrestricted flow through the hoses or from the tanks can be on the order of 3 gallons per minute or 180 gallons an hour. Clearly, in an unmonitored situation, the flow of water will rapidly exceed the storage capacity of a catch basin and also can exceed the capacity of a drain positioned within the catch basin.

Toilets can be a source of flooding as well. Generally, toilets include both a float valve and a seal that stops the flow of water into the toilet. If a drain line of the toilet becomes plugged, or if the float valve or seal malfunctions, water can spill from within the toilet bowl or refill tank onto the floor. In addition, the water supply line to the toilet can become loosened or can fail. In such instances, water will be surging onto the bathroom floor until the manually operated valve, which is typically located behind the toilet, is shut off. Thus, large amounts of water can flood a bathroom if the condition remains unmonitored.

Water heaters can also be a source of flooding. If a tank of the water heater springs a leak or if a water line connected to the water heater breaks, water will surge into the dwelling until the supply valve to the water heater is shut off. With water heaters, however, it is also desirable to shut off the flow of electricity and heating fuel, such as oil or gas, to the water heater.

Many prior art appliance leak detector and shut-off systems include a water sensor, or leak detector pad, a controller, and a water supply valve. The leak detector pad is placed on the floor near an appliance to be monitored. Upon contacting water during flooding, the detector pad sends a signal to the control, which in turn causes the water supply valve to close to prevent further flooding.

What is still desired is a new and improved leak detector pad. Preferably the leak detector pad will be compact, ruggedized, waterproof, include no moving parts, be protected from dirt and corrosion, and be reusable after a flood. In addition, the leak detector pad will preferably be able to transmit an alarm signal a relatively long distance, such as 150 feet.

SUMMARY OF THE DISCLOSURE

The present disclosure provides a new and improved leak detector pad. According to one exemplary embodiment, the pad includes a circuit board having a bottom surface and a top surface, spaced first and second electrically conductive traces located on the bottom surface, and an electronic circuit mounted on the top surface. The circuit includes a first segment adapted to create an alternating current (AC) voltage waveform, a second segment adapted to apply the AC voltage waveform between the traces on the bottom surface of the circuit board, a third segment adapted to create a measure of a capacitance between the traces based upon an AC current flowing between the traces as a result of the AC voltage waveform, and a fourth segment adapted to create a direct current (DC) voltage alarm signal if the measure of capacitance provided by the third segment indicates the presence of fluid.

According to one aspect, the leak detector pad further includes a watertight encapsulation layer covering the top and bottom surfaces of the circuit board and the electronic circuit and the traces. According to an additional aspect, the pad also includes a relatively thicker shock-absorbing, watertight over-mold layer covering the encapsulation layer on the top surface of the circuit board and the electronic circuit, side edges of the circuit board, and the encapsulation layer on edge portions of the bottom surface of the circuit board.

Among other aspects and advantages, the new and improved leak detector pad of the present disclosure is compact, ruggedized, waterproof, includes no moving parts, is protected from dirt and corrosion, and can be reused after a flood. In addition, the DC voltage alarm signal produced by the leak detector pad can be transmitted a relatively long distance.

Additional aspects and advantages of the present disclosure will become readily apparent to those skilled in this art from the following detailed description, wherein only an exemplary embodiment of the present disclosure is shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF DRAWINGS

Reference is made to the attached drawings, wherein elements having the same reference character designations represent like elements throughout, and wherein.

DETAILED DESCRIPTION OF EXEMPLARY EMBODIMENTS

Figure 1:
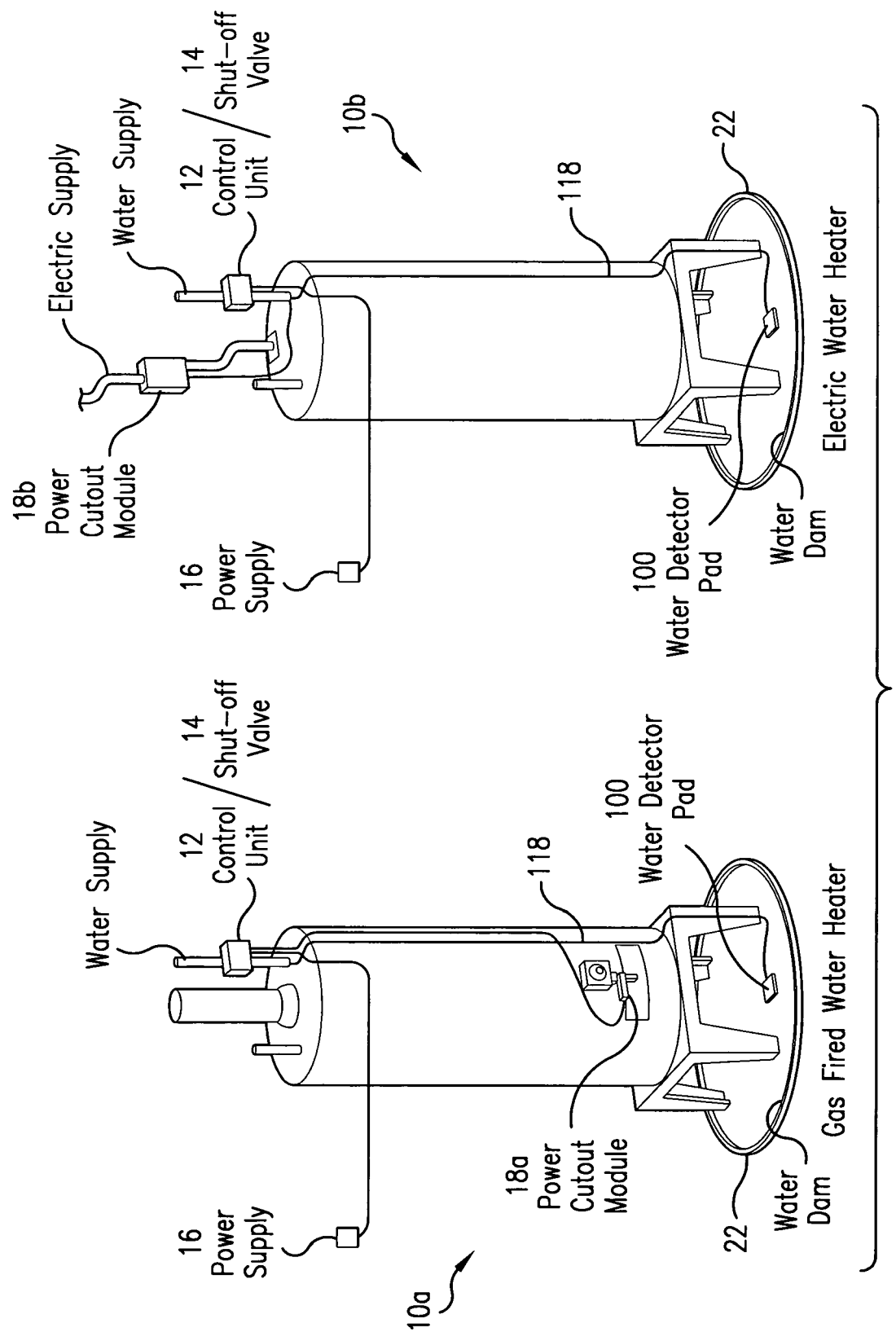
FIG. 1 is a perspective view of two exemplary embodiments of water heater leak detector shut-off systems including leak detector pads constructed in accordance with the present disclosure.
Figure 2:
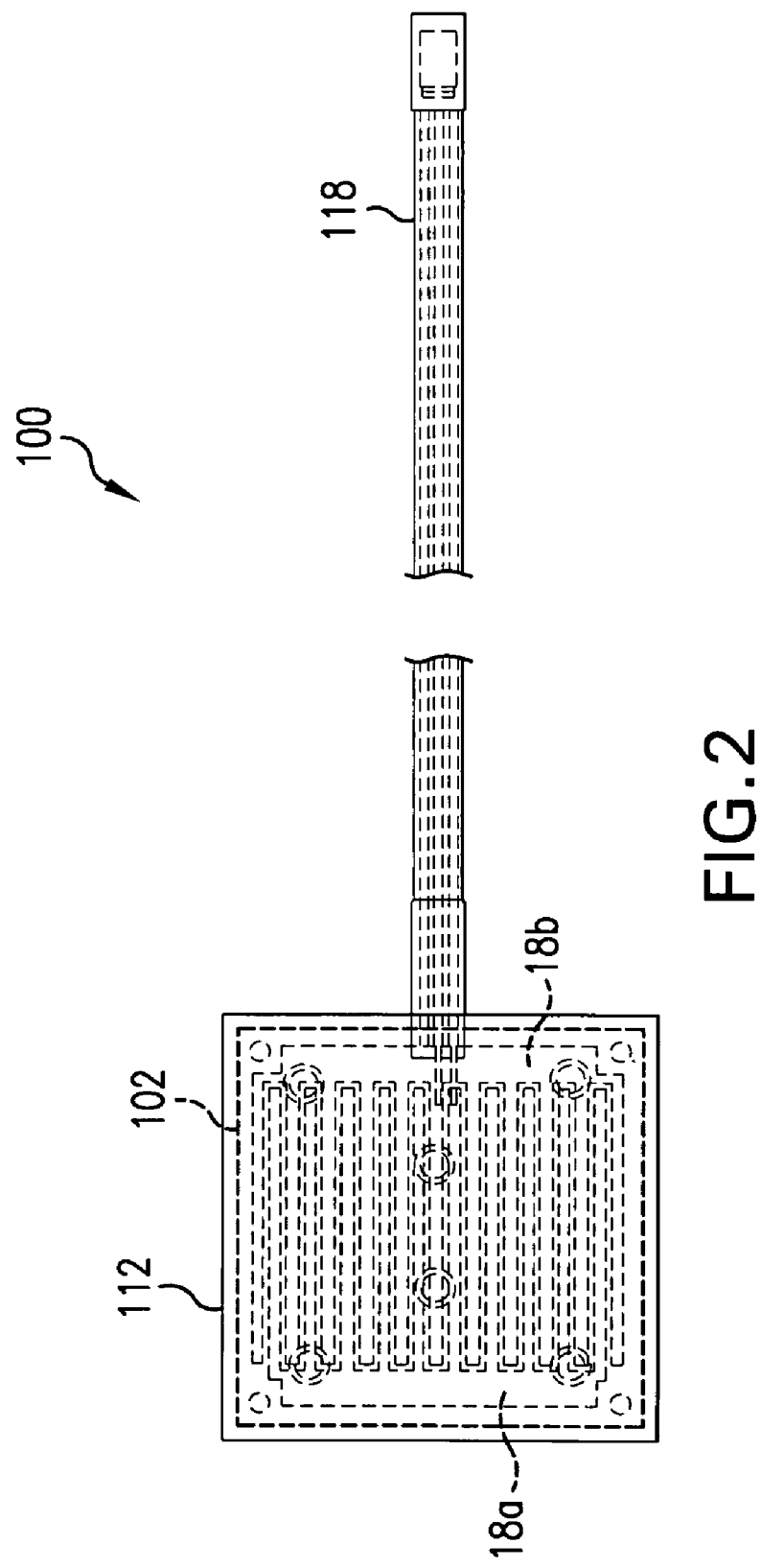
FIG. 2 is an enlarged top plan view of the leak detector pad of FIG. 1.
Figure 3:
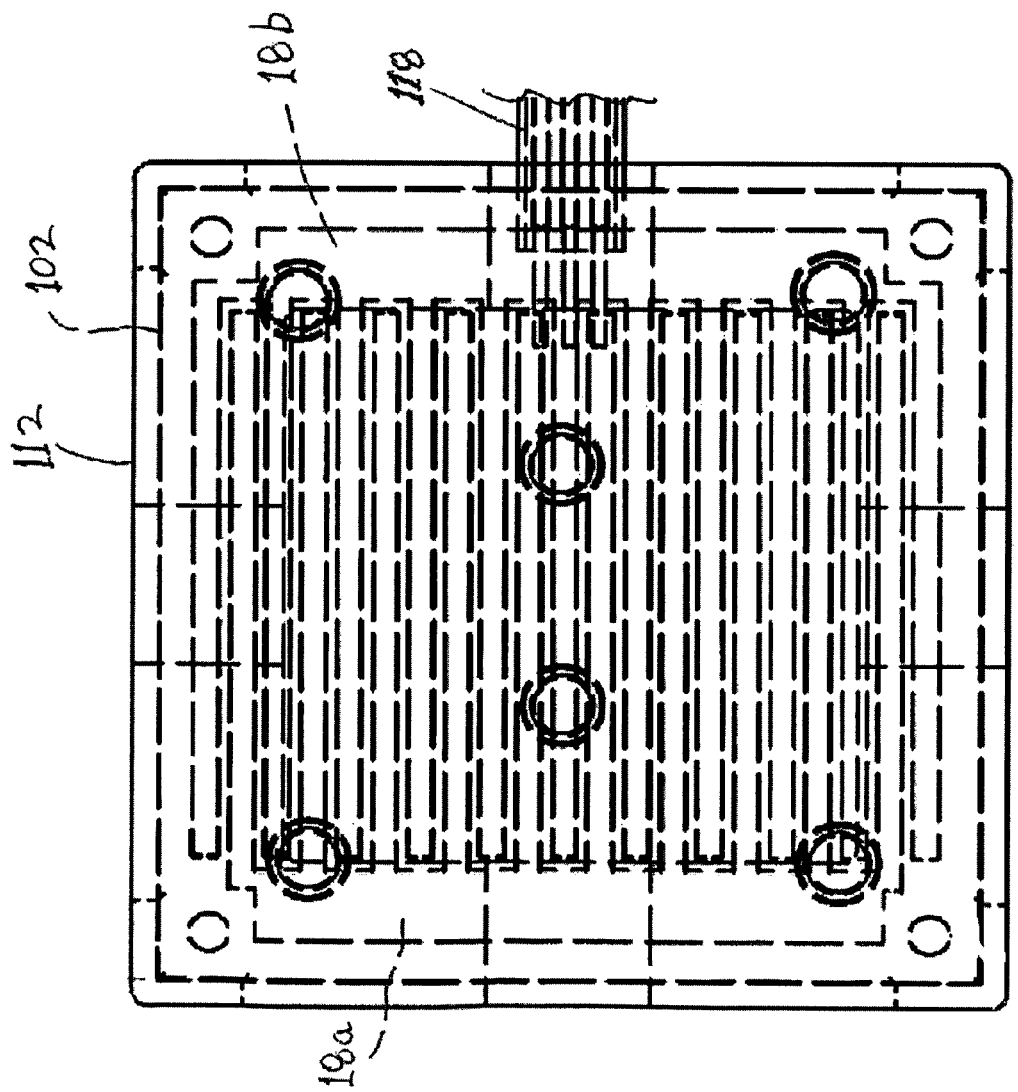
FIG. 3 is a further enlarged top plan view of the leak detector pad of FIG. 1.
Figure 4:
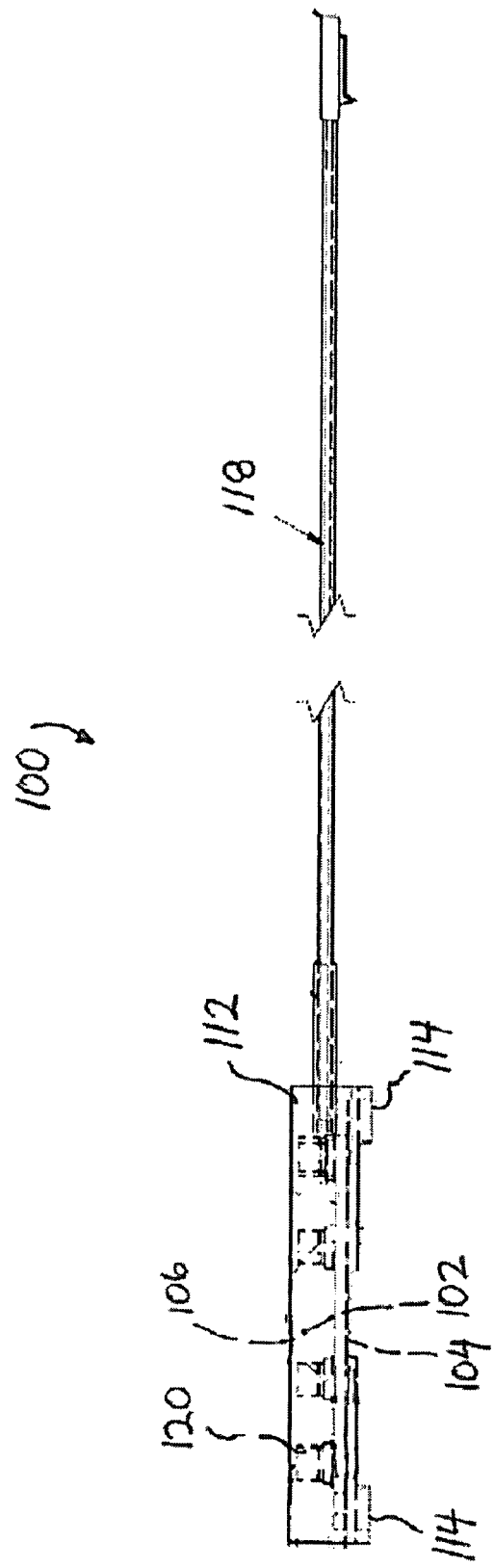
FIG. 4 is an enlarged side elevation view of the leak detector pad of FIG. 1.
Figure 5:
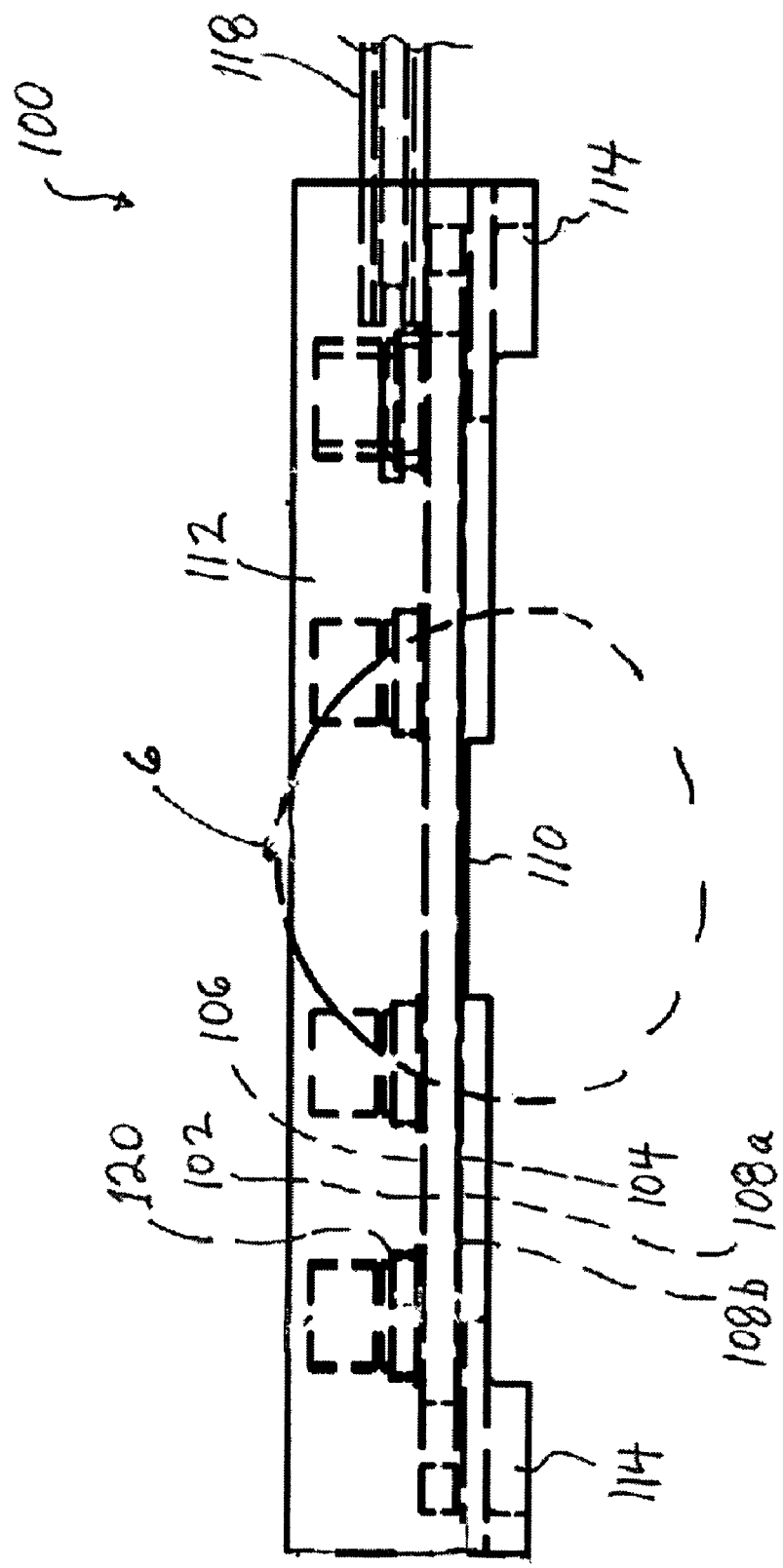
FIG. 5 is a further enlarged side elevation view of the leak detector pad of FIG. 1.
Figure 6:
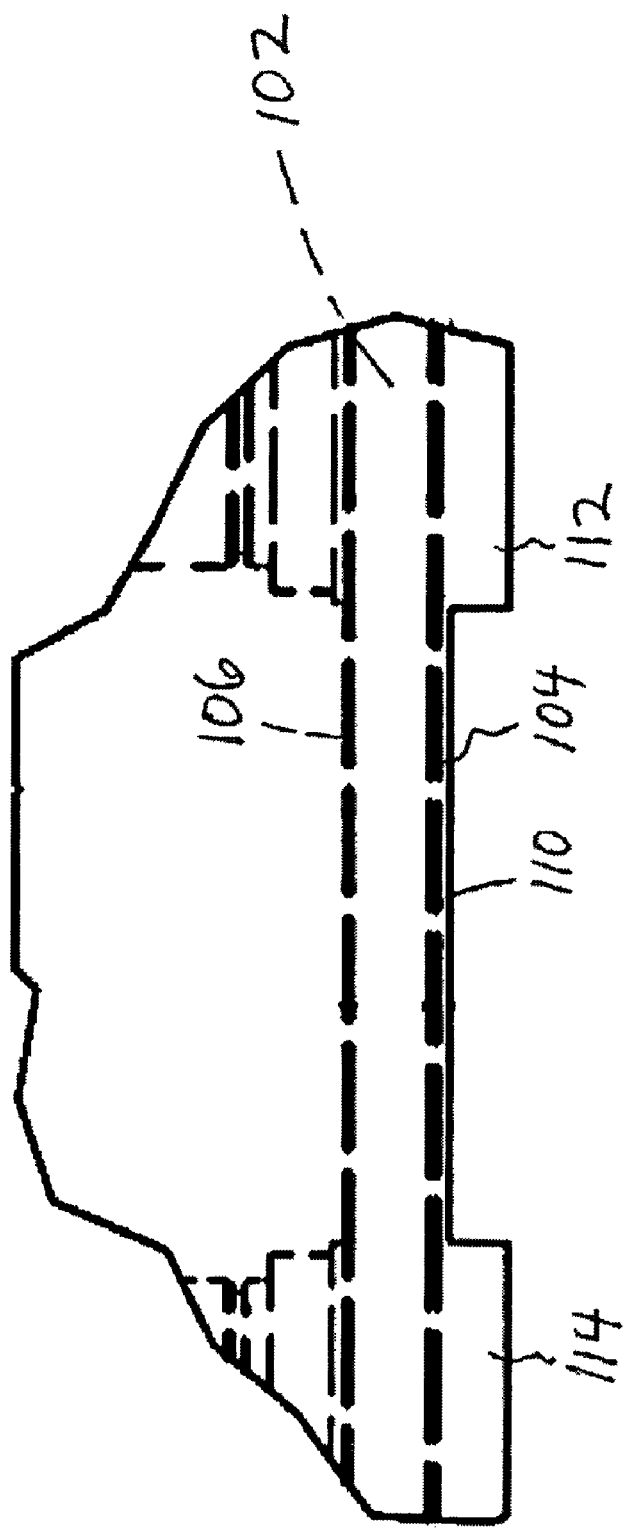
FIG. 6 is an even further enlarged side elevation view of a portion of the leak detector pad of FIG. 1 contained within circle 6 of FIG. 5.
Figure 7:
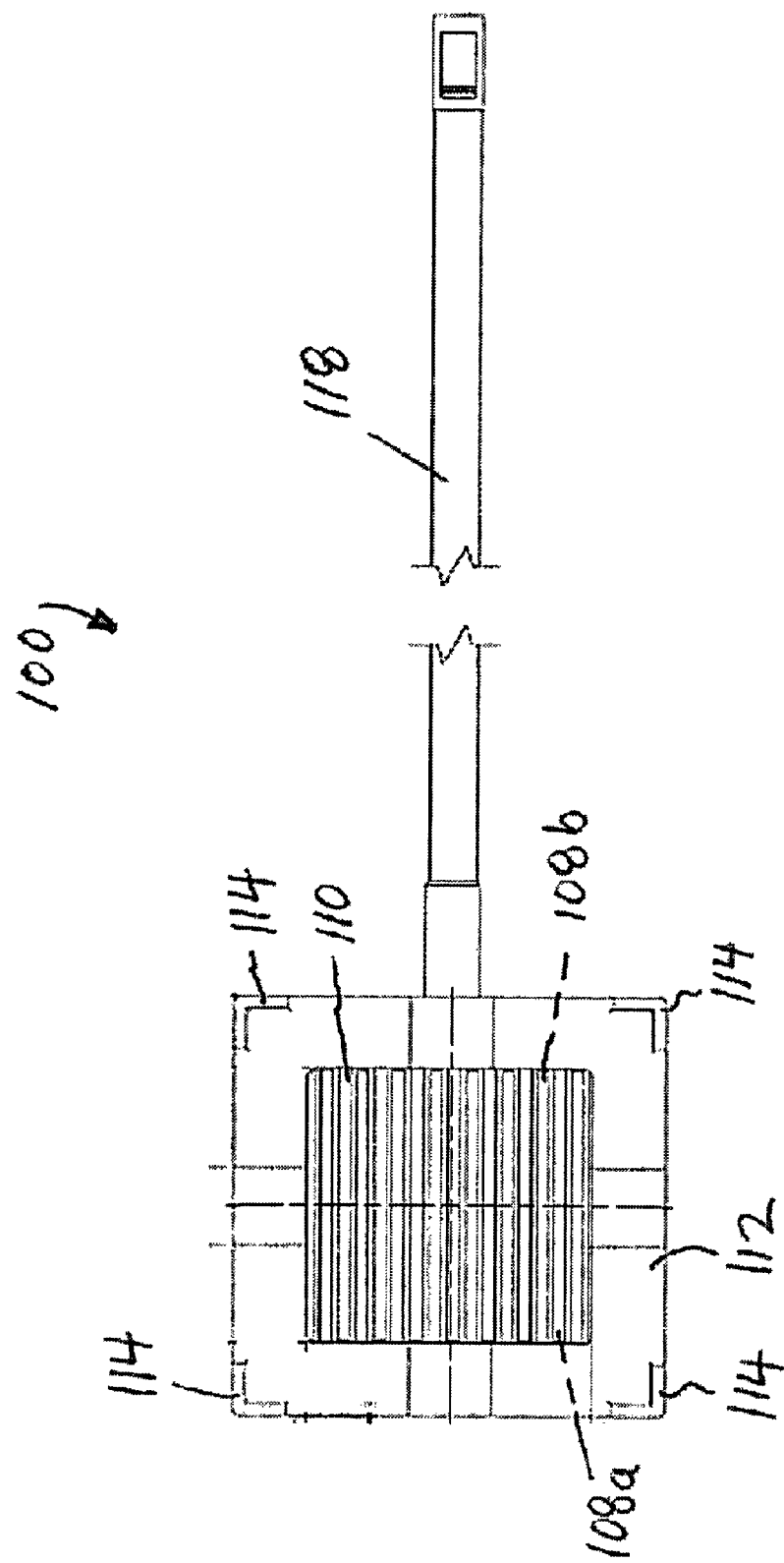
FIG. 7 is an enlarged bottom plan view of the leak detector pad of FIG. 1.
Figure 8:
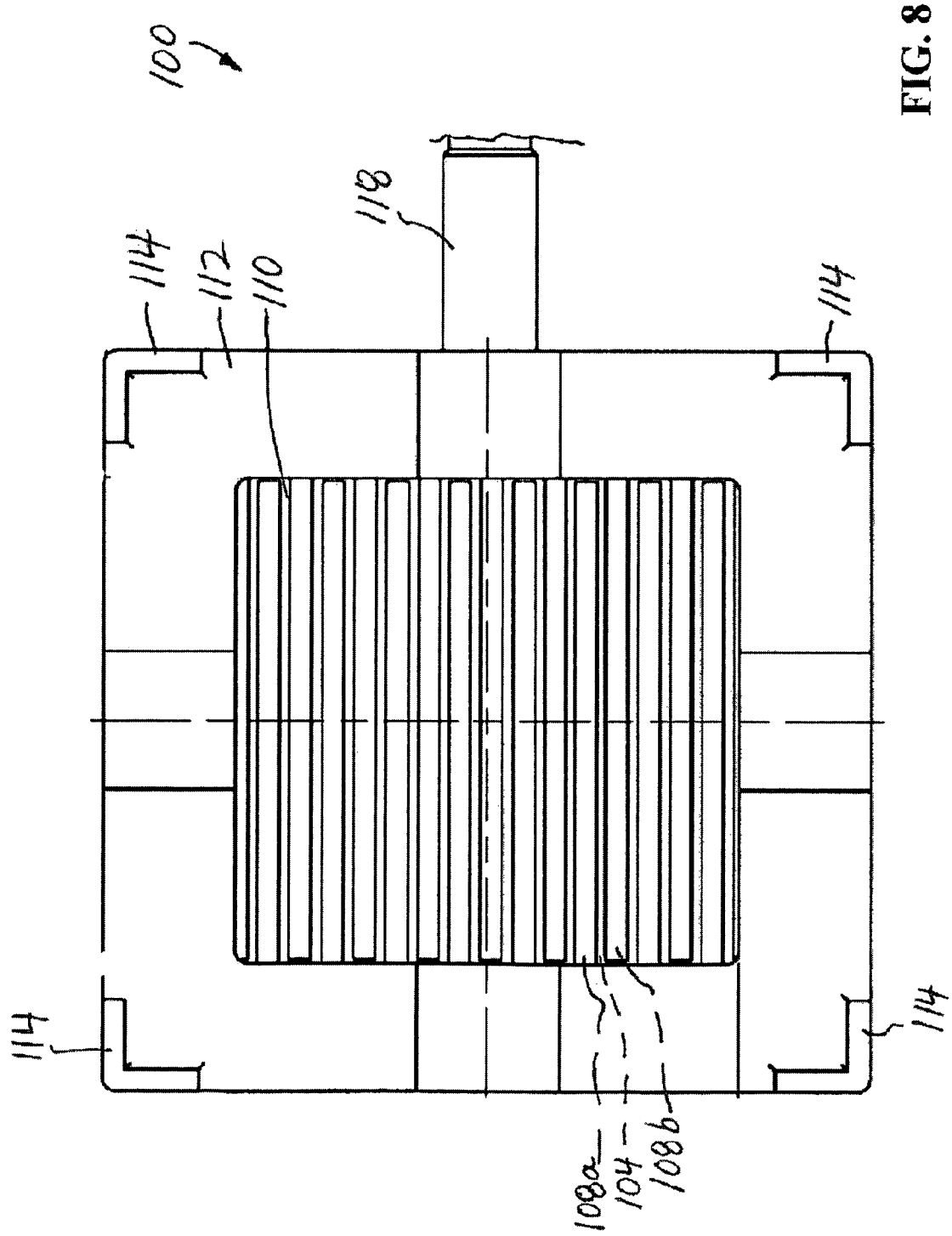
FIG. 8 is a further enlarged bottom plan view of the leak detector pad of FIG. 1.

Referring to FIG. 1, there are shown two exemplary embodiments of water heater leak detector shut-off systems 10a, 10b including new and improved leak detector pads 100 constructed in accordance with the present disclosure. Among other benefits, the new and improved leak detector pad 100 of the present disclosure is compact, ruggedized, waterproof, includes no moving parts, is protected from dirt and corrosion, and can be reused after a flood. In addition, the leak detector pad 100 can transmit a signal a relatively long distance, such as 150 feet. FIGS. 2-13 provide further detailed views of the detector pad 100, but first the shut-off systems 10a, 10b are discussed to provide background information for the detector pad.

In FIG. 1 there is shown a gas water heater and an electric water heater. In both cases, the shut-off systems 10a, 10b include a control unit 12, a water supply shut-off valve 14, and a power supply 16 in addition to the leak detector pads 100. The power supply 16 is adapted to receive an alternating current (AC) voltage and convert the AC voltage to a direct current (DC) voltage for the shut-off system. For the gas water heater, the shut-off system 10a also includes a power cutout module 18a for a natural gas burner of the heater (for oil heaters the power cutout module is connected to an oil burner), while for the electric water heater the shut-off system 10b includes a power cutout module 18b for an electricity supply line connected to the heater. The shut-off systems also include water dams 22, which surround the water detector pads 100 to collect water leaking from the heaters.

During a flood that is a result of a leak from the water heaters, water collects around the water detector pads 100 and the pads send alarm signals to the control units 12, which in turn activate the shut-off valves 14 and the power cutout modules 18a, 18b. The control units 12 also include alarms, such as a noisemaker and/or a light, to indicate that the water heater has been shut off due to a leak. The shut-off systems 10a, 10b thereby prevent additional water, power, and natural gas from reaching the water heaters until the heater is fixed and the shut-off systems 10a, 10b reset. Because of the waterproof construction of the detector pads 100, the pads can be dried and reused once the floor is also dried.

Figure 9:
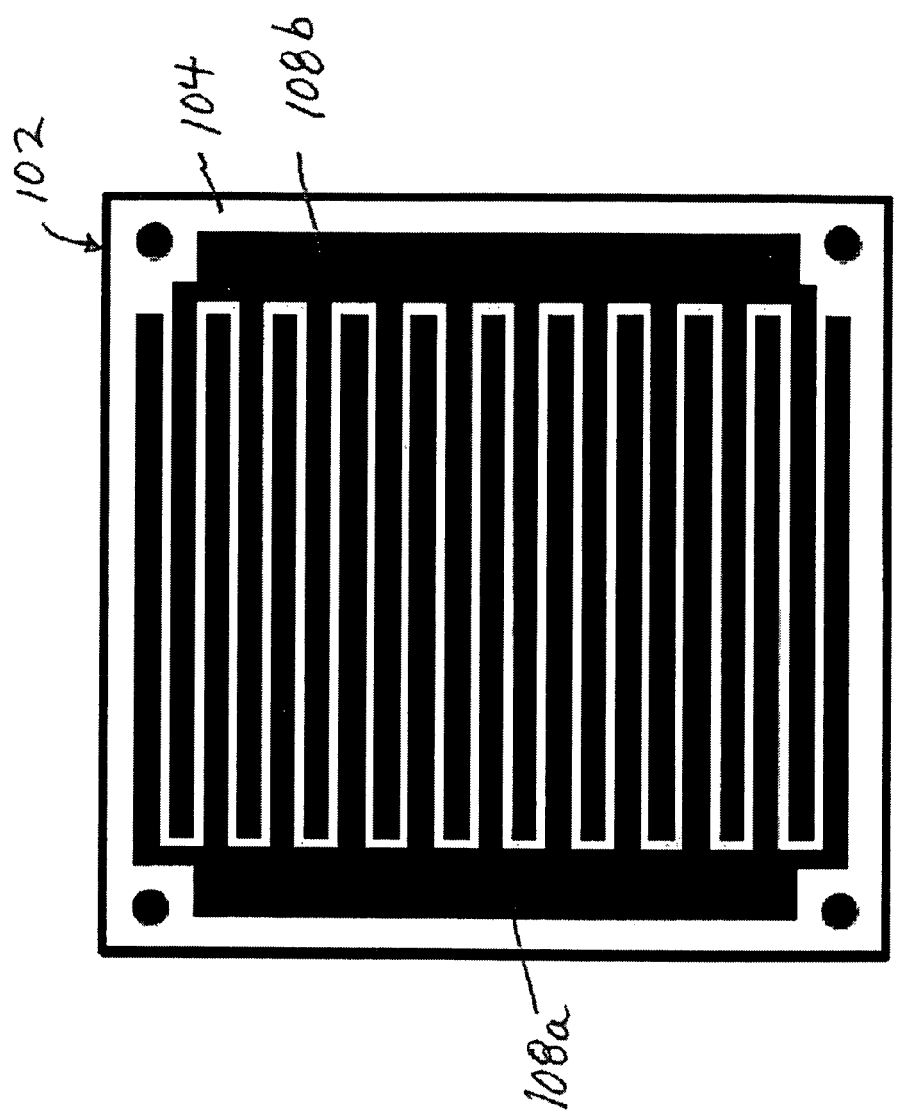
FIG. 9; is a plan view of a bottom surface of a circuit board of the leak detector pad of FIG. 1, wherein exemplary embodiments of two traces according to the present disclosure are shown.
Figure 10:
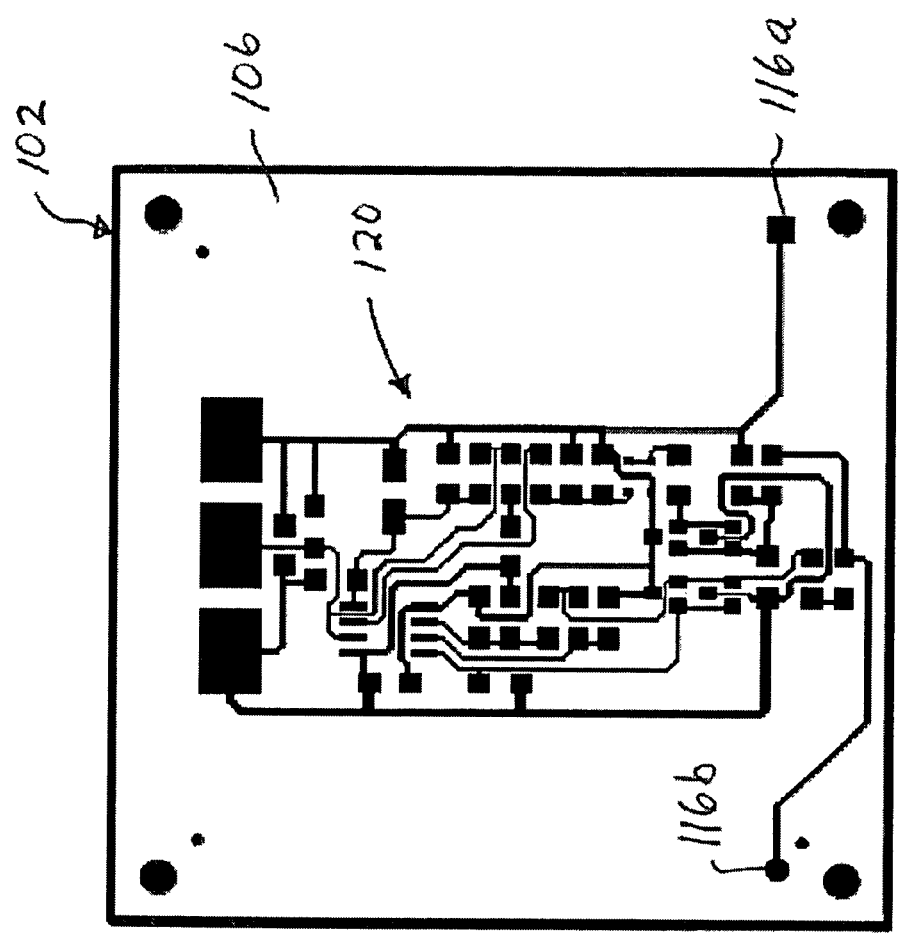
FIG. 10 is a plan view of a top surface of the circuit board of the leak detector pad of FIG. 1, wherein an exemplary embodiments of a layout of an electronic circuit according to the present disclosure is shown.

Referring now to FIGS. 2-13, the leak detector pad 100 includes a circuit board 102 having a bottom surface 104 and a top surface 106, spaced first and second electrically conductive traces 108a, 108b located on the bottom surface of the circuit board 104, as shown best in FIG. 9, and an electronic circuit 120 mounted on the top surface 106 of the circuit board 102, as shown best in FIG. 10. A watertight encapsulation layer 110 covers the bottom surface 104 of the circuit board 102 and the traces 108a, 108b and the top surface 106 of the circuit board and the electronic circuit 120. The encapsulation layer 110 can be seen, for example, in the enlarged view of the pad 100 shown in FIG. 6. According to one exemplary embodiment, the waterproof encapsulation layer 100 comprises a thermoplastic polyamide, such as the MACROMELT® OM line of low pressure molding materials available from Henkel in Düsseldorf, Germany.

The leak detector pad 100 also includes a relatively thicker, shock-absorbing, watertight over-mold layer 112 covering the encapsulation layer 110 on the top surface 106 of the circuit board 102 and the electronic circuit 120, side edges of the circuit board 102, and the encapsulation layer 110 on edge portions of the bottom surface 104 of the circuit board. As shown best in FIGS. 7 and 8, the over-mold layer 112 does not extend over fingers of the traces 108a, 108b. The over-mold layer 112 includes legs 114 extending from the edge portions of the bottom surface 104 of the circuit board 120, as shown best in FIGS. 4-8. According to one exemplary embodiment, the over-mold layer 112 also comprises a thermoplastic polyamide, such as the MACROMELT® OM line of low pressure molding materials.

Referring to FIG. 9, the traces 108a, 108b comprise co-planer inter-digitated fingers. The traces 108a, 108b are made of an electrically conductive material, such as copper, and are connected to the electronic circuit 120 through holes 116a, 116b in the circuit board 102. The holes 116a, 116b can be seen, for example, in FIG. 10.

Figure 11:
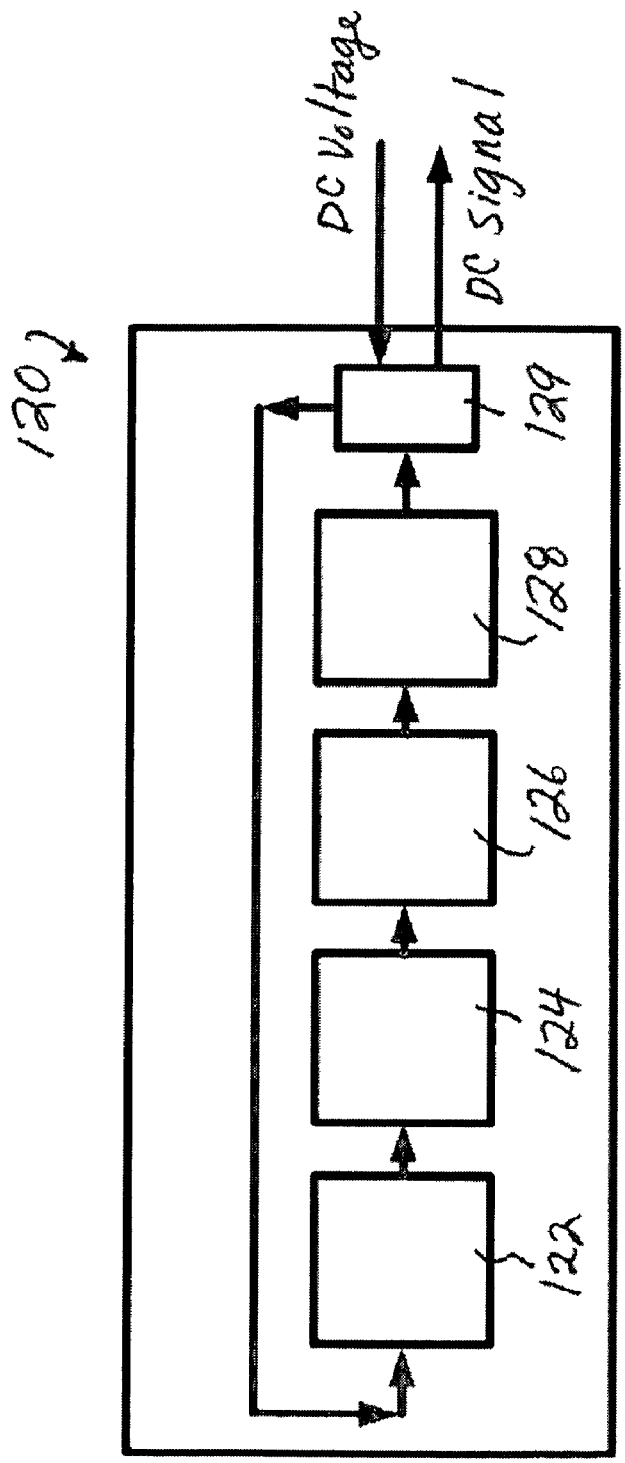
FIG. 11 is a block diagram of the electronic circuit of the leak detector pad of FIG. 1.
Figure 12:
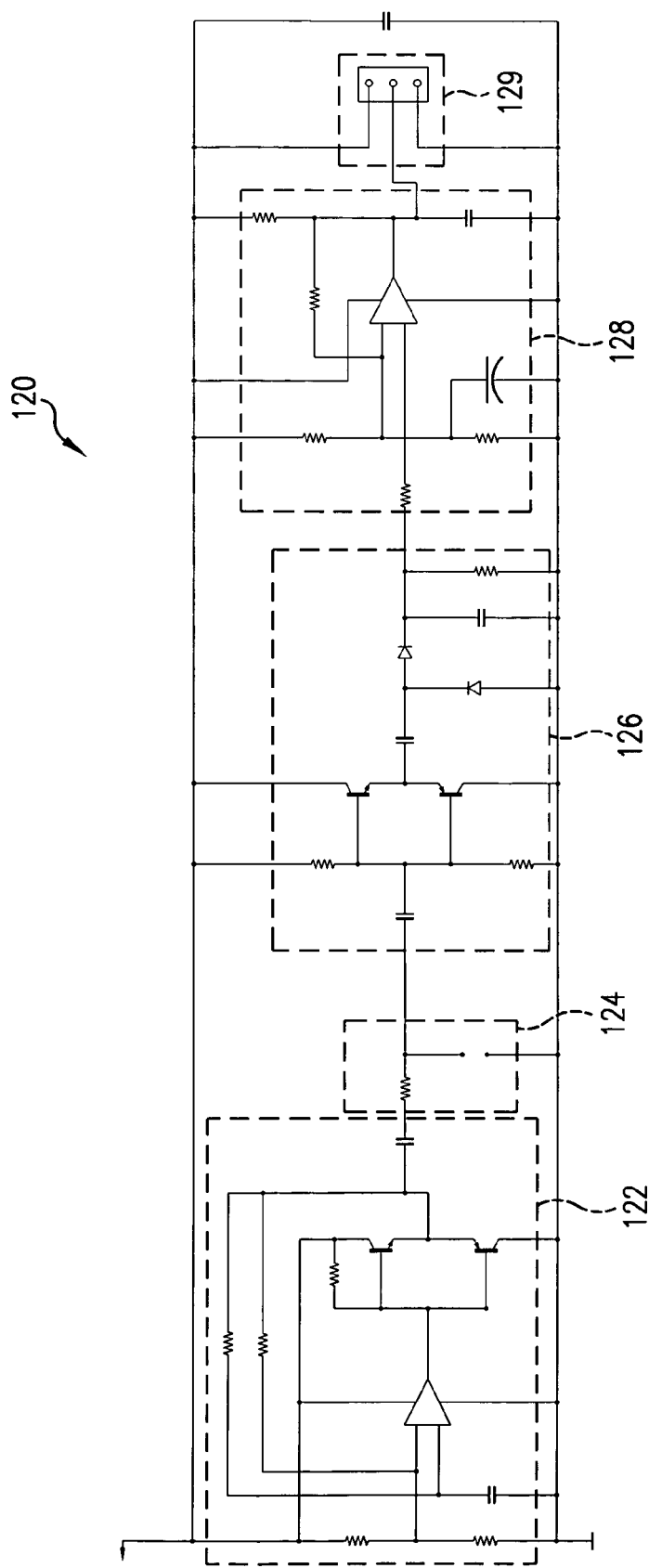
FIG. 12 is an exemplary embodiment of an electrical schematic of the electronic circuit of the leak detector pad of FIG. 1.
Figure 13A:
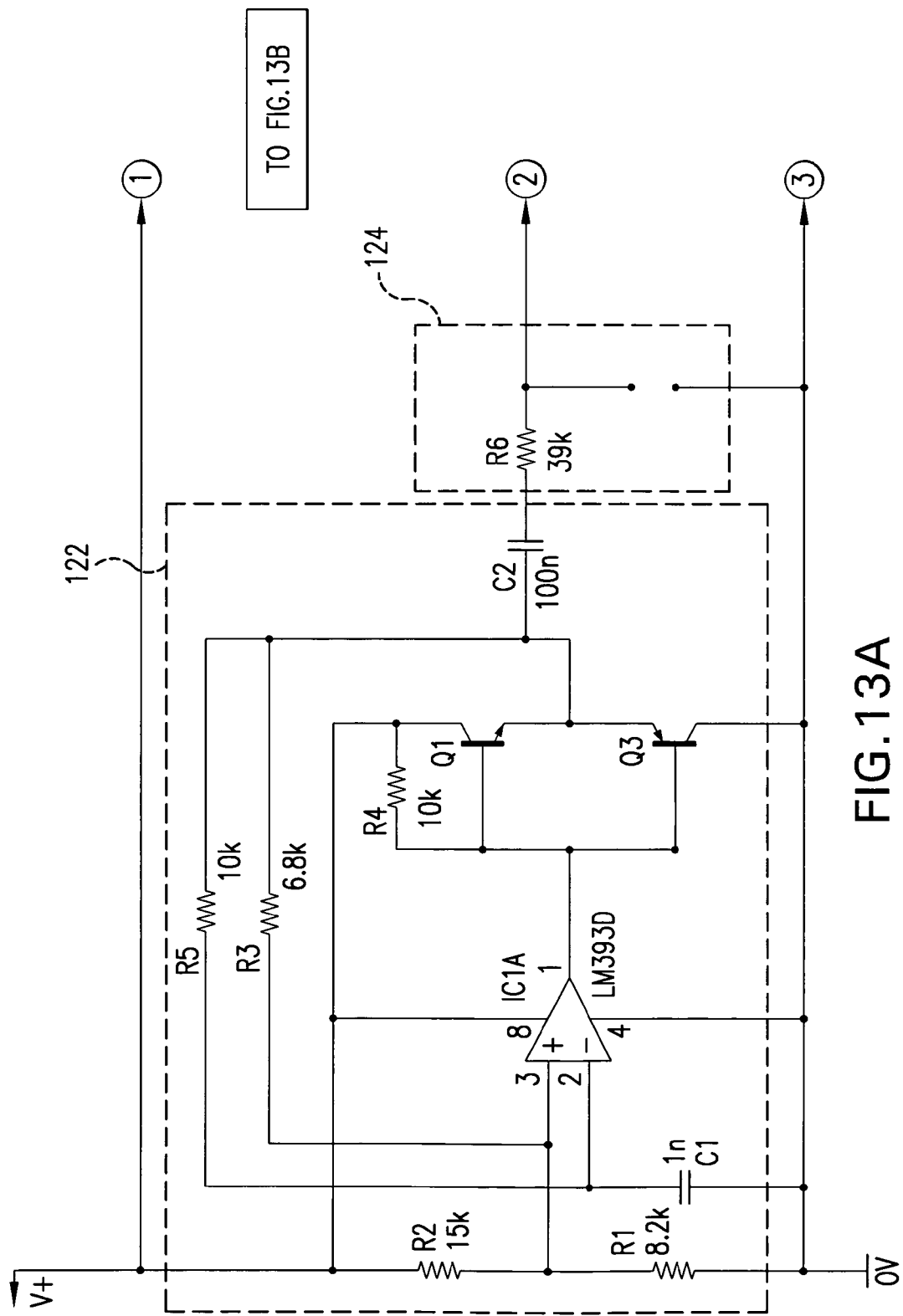
FIGS. 13A, 13B, and 13C are an enlarged view of the schematic of FIG. 12.
Figure 13B:
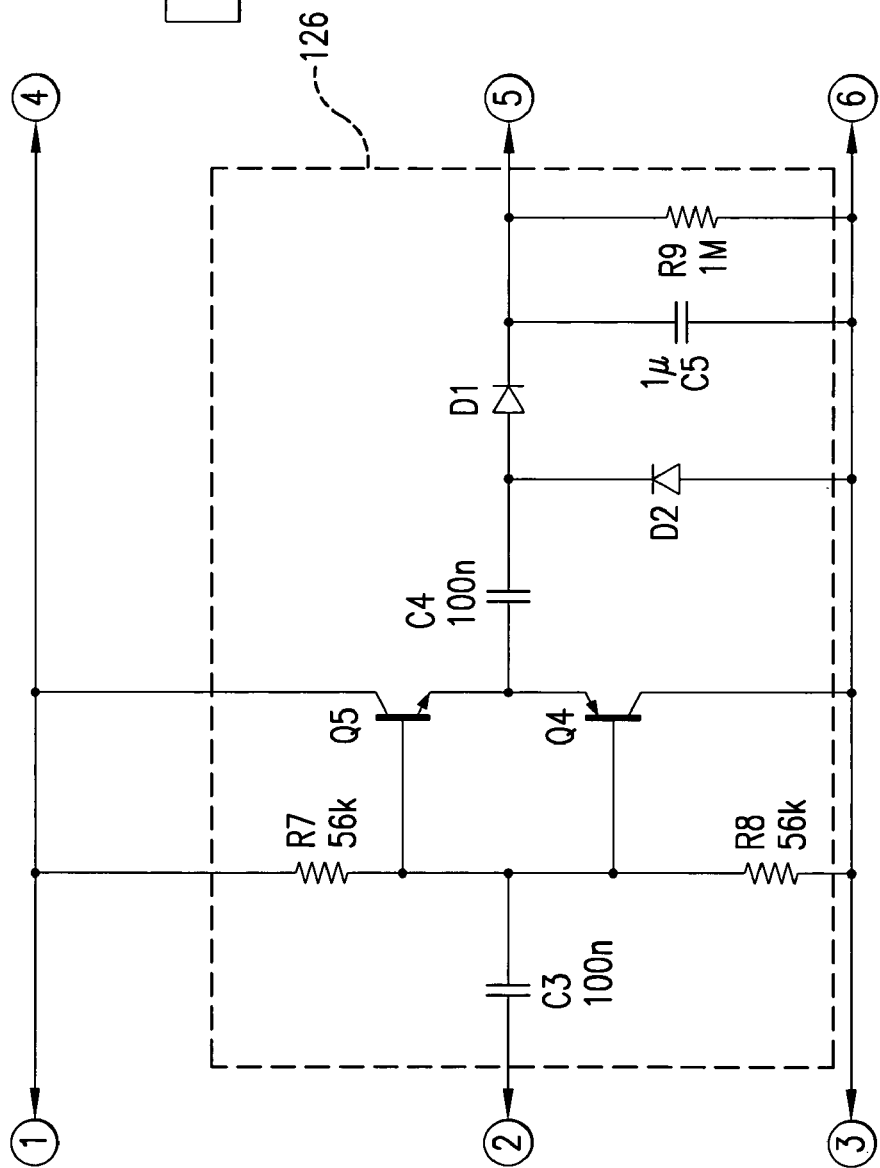
Figure 13C:
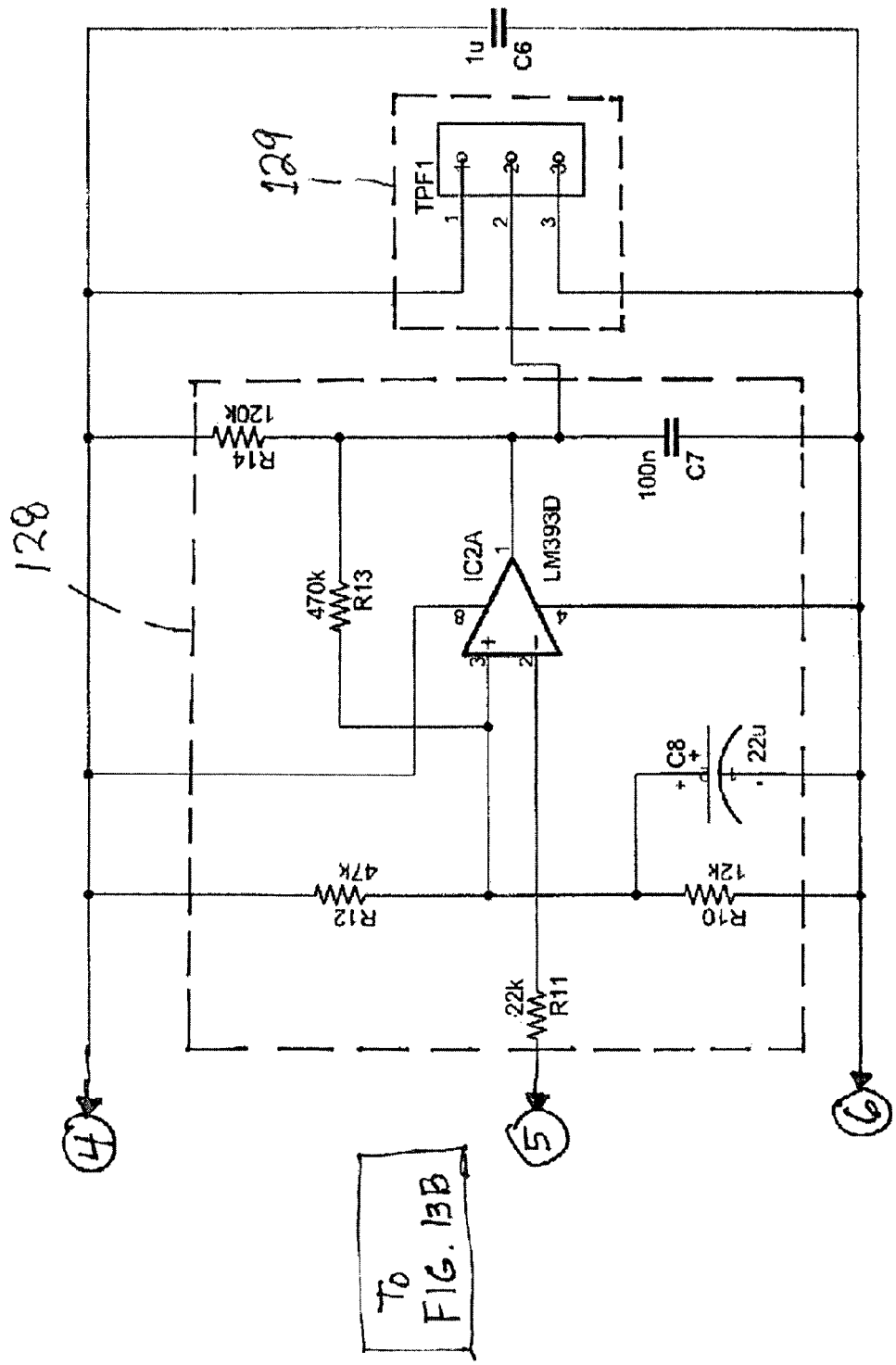

Referring to FIGS. 11-13, the electronic circuit 120 includes a first segment 122 adapted to create an AC voltage waveform from the DC voltage provided by the control unit 12, a second segment 124 adapted to apply the AC voltage waveform between the traces 108a, 108b on the bottom surface 104 of the circuit board 102, a third segment 126 adapted to create a DC voltage indicative of a measure of a capacitance between the traces 108a, 108b based upon an AC current flowing between the traces 108a, 108b as a result of the AC voltage waveform, and a fourth segment 128 adapted to create a DC voltage alarm signal if the measure of capacitance provided by the third segment 126 indicates the presence of fluid.

The electronic circuit 120 further includes a fifth segment 129 connected to a cable 118 for connection to the control unit 12. The fifth segment 129 is adapted to provide electrical power to the other segments of the circuit 120 and receive the DC voltage alarm signal from the fourth segment 128. The watertight over-mold layer 112 extends over a portion of the cable 118 to provide strain relief.

The present disclosure, therefore, provides a new and improved leak detector pad. It should be understood, however, that the exemplary embodiment described in this specification has been presented by way of illustration rather than limitation, and various modifications, combinations and substitutions may be effected by those skilled in the art without departure either in spirit or scope from this disclosure in its broader aspects and as set forth in the appended claims. Accordingly, other embodiments are within the scope of the following claims. In addition, the leak detector pad disclosed herein, and all elements thereof, are contained within the scope of at least one of the following claims. No elements of the presently disclosed leak detector pad are meant to be disclaimed.

What is claimed is:

1. A leak detector pad comprising:
a circuit board having a bottom surface and a top surface;
spaced first and second electrically conductive traces located on the bottom surface of the circuit board;
an electronic circuit mounted on the top surface of the circuit board and including,
a first segment adapted to create an alternating current (AC) voltage waveform,
a second segment adapted to apply the AC voltage waveform between the traces on the bottom surface of the circuit board,
a third segment adapted to create a measure of a capacitance between the traces based upon an AC current flowing between the traces as a result of the AC voltage waveform, and
a fourth segment adapted to create a direct current (DC) voltage alarm signal if the measure of capacitance provided by the third segment indicates a presence of fluid.

2. A leak detector pad according to claim 1, further comprising a watertight encapsulation layer covering the bottom surface of the circuit board and the traces.

3. A leak detector pad according to claim 2, wherein the watertight encapsulation layer also covers the top surface of the circuit board and the electronic circuit.

4. A leak detector pad according to claim 3, further comprising a relatively thicker shock-absorbing, watertight overmold layer covering the encapsulation layer on the top surface of the circuit board and the electronic circuit, side edges of the circuit board, and the encapsulation layer on edge portions of the bottom surface of the circuit board.

5. A leak detector pad according to claim 4, wherein the over-mold layer includes legs extending from the edge portions of the bottom surface of the circuit board.

6. A leak detector pad according to claim 4, further comprising a cable connected to the electronic circuit and wherein the water-tight over-mold layer extends over a portion of the cable to provide strain relief.

7. A leak detector pad according to claim 1, wherein the traces comprise inter-digitated fingers.

8. A leak detector pad according to claim 6, wherein the traces are co-planar.

9. A leak detector pad according to claim 1, wherein the traces are copper.

10. A leak detector pad according to claim 1, wherein the traces are connected to the electronic circuit through holes in the circuit board.

11. A leak detector pad according to claim 1, wherein the third segment of the electronic circuit is adapted to create a DC voltage indicative of the measure of the capacitance between the traces.

12. A leak detector pad according to claim 1, wherein the electronic circuit further includes a fifth segment connected to at least one cable for connection to a source of electrical power and a device for receiving the DC voltage alarm signal, wherein the fifth segment is adapted to provide electrical power to the other segments of the circuit and receive the DC voltage alarm signal from the fourth segment.

13. A leak detector pad according to claim 12, wherein the electronic circuit is adapted to receive electrical power in the form of a DC voltage.

14. A water detector shut-off system including the leak detector pad of claim 1 and further including:
a valve for controlling a water supply; and
a controller adapted to close the valve upon receiving the DC voltage alarm signal from the leak detector pad.

15. A system according to claim 14, further comprising an alarm, wherein the controller is adapted to activate the alarm upon receiving the DC voltage alarm signal from the leak detector pad and activate power cutout modules to shut off power.

16. A system according to claim 15, further comprising a dam surrounding the detector pad, a reset button associated with the controller adapter, and a noisemaker/warning light associated with the alarm.

17. A leak detector pad comprising:
a circuit board having a bottom surface and a top surface, and holes connecting the bottom and top surfaces;
spaced first and second electrically conductive traces located on the bottom surface of the circuit board; and
an electronic circuit mounted on the top surface of the circuit board and connected to the traces through the holes in the board, the circuit including,
means for creating an alternating current (AC) voltage waveform,
means for applying the AC voltage waveform between the traces on the bottom surface of the circuit board,
means for creating a measure of a capacitance between the traces based upon an AC current flowing between the traces as a result of the AC voltage waveform, and
means for creating a direct current (DC) voltage alarm signal if the measure of capacitance indicates the presence of fluid.

18. A leak detector pad according to claim 17, further comprising a watertight encapsulation layer covering the bottom surface of the circuit board and the traces.

19. A leak detector pad comprising:
a circuit board having a bottom surface and a top surface, and holes connecting the bottom and top surfaces;
spaced first and second electrically conductive traces located on the bottom surface of the circuit board;
an electronic circuit mounted on the top surface of the circuit board and connected to the traces through the holes in the board, the circuit adapted to measure a capacitance between the traces, and create a direct current (DC) voltage alarm signal if the capacitance indicates the presence of fluid; and
a water-tight encapsulation layer covering the bottom surface of the circuit board and the traces.

20. A leak detector pad according to claim 19, wherein the watertight encapsulation layer also covers the top surface of the circuit board and the electronic circuit.

* * * * *